(12) United States Patent
Davis et al.

(10) Patent No.: US 7,173,908 B2
(45) Date of Patent: Feb. 6, 2007

(54) FLEXIBLE POLICING TECHNIQUE FOR TELECOMMUNICATIONS TRAFFIC

(75) Inventors: Tom Davis, Ottawa (CA); Predrag Kostic, Burnaby (CA)

(73) Assignee: Alcatel Canada Inc., Kanata (CA)

( * ) Notice: Subject to any disclaimer, the term of this patent is extended or adjusted under 35 U.S.C. 154(b) by 1051 days.

(21) Appl. No.: 10/189,464

(22) Filed: Jul. 8, 2002

(65) Prior Publication Data

US 2004/0005896 A1    Jan. 8, 2004

(51) Int. Cl.
*H04L 12/56*    (2006.01)
(52) U.S. Cl. .................................. 370/235.1
(58) Field of Classification Search ................ 370/229, 370/230, 235, 235.1
See application file for complete search history.

(56) References Cited

U.S. PATENT DOCUMENTS 5,524,006 A    6/1996 Hluchyj et al. ............... 370/84
5,541,913 A    7/1996 Witters et al. ................ 370/17

FOREIGN PATENT DOCUMENTS

EP    WO 93 11622    9/1993

OTHER PUBLICATIONS

J. Heinanen et al, "A Single Rate Three Color Marker", Network Working Group (IETF), Request for Comments: 2697, Sep. 1999, pp. 1-6.

*Primary Examiner*—Derrick W. Ferris
(74) *Attorney, Agent, or Firm*—Jim Zegeer

(57) ABSTRACT

A policing technique for a telecommunications traffic of variable length packets is described. The technique uses a plurality of police engines, grouped in pairs. A selection module selects a police engine pair to process a packet. Each police engine contains a conformance unit, credit unit and a debit unit, in which the credit update of one police engine influences the credit update of the other police engine in the pair. The technique also uses a combinatorial function to decide on a category of a processed packet and which police engines to update their debit units.

12 Claims, 3 Drawing Sheets

FLEXIBLE POLICING TECHNIQUE FOR TELECOMMUNICATIONS TRAFFIC

TECHNICAL FIELD

The present invention relates to traffic control in telecommunications and, more particularly, to a policing technique for a telecommunications traffic of variable length packets. The technique uses a plurality of policing engines, grouped in pair and is applicable to policing algorithms in which update algorithms for the policing engines are codependent.

BACKGROUND OF THE INVENTION

Telecommunications network includes a variety of traffic control mechanisms. Policing mechanisms are those which monitor traffic streams and/or substreams to see if they conform to set parameters and/or to take any necessary actions in case of non conformance. Their action may involve, dropping or discarding packets which are out-of-profile (non-conforming), and marking or tagging packets in priority or colours.

A known policing mechanism employs a scheduling algorithm known as virtual scheduling algorithm (VSA for short). The VSA can be thought of as being split up into two parts, a conformance check part indicating whether or not a packet in a stream is to be discarded according to a VSA instance and an update part in which a basic parameter used by the VSA, e.g., the predicted arrival time, is updated as a function of the arrival time of a non-discarded packet.

A traffic stream in the telecommunications network is made up of series of packets (or cells in some instances) which may be of fixed or variable lengths. There are many traffic streams flowing in the network and two or more traffic streams may be arranged in a hierarchical structure. A packet, therefore, may belong to one or more traffic streams. Each traffic stream, in turn, may comprise either one or two substreams (e.g., high priority packet substream and aggregate substream containing both high and low priority packets). Therefore, in this example, a high priority packet also belongs to both substreams. Each substream has a single rate control and contains rate parameters (e.g., rate and burst tolerance), and policing state (e.g., predicted arrival time). One policing engine is required for each substream to which a packet belongs.

For example, an ATM cell stream contains high and low priority cells, indicated by the CLP bit. For such an ATM cell stream, the ITU-TS recommendation I.371 prescribes that the substream of high priority first cells is to be policed separately, whereas the aggregate ATM stream (or "aggregate substream" to be consistent in the usage of the term) of both first and second cells is also to be policed as a whole. One way to achieve this is to use a processing means in which two series connected processors each apply a specific police algorithm instance to a specific substream. The first processor thus operates according to an instance of a VSA on one substream that consists of the high priority first cells, whereas the second processor operates according to a similar VSA instance on the other substream which includes both unpoliced low priority second cells and policed high priority first cells.

U.S. Pat. No. 5,541,913 Jul. 30, 1996 Witters et al describes a policing device of the above known type but with a more generic architecture easily adaptable to a wide variety of distinct policing methods. The architecture therefore arranges multiple instantiations of police engines in parallel and is described to be easily adaptable to not only a large number of distinct policing methods for the ATM stream but also to those that may be realized as the result of subsequent changes to the ITU recommendation.

FIG. 1 illustrates schematically the policing device of the above patent.

Though described as applicable to arbitrary algorithms, the policing device includes a plurality of parallel police processors 10, 12, each of which implements a Modified Virtual Scheduling Algorithm (MVSA for short), which can in general be separated into two stages of processing: update and conformance. The update stage maintains the algorithm state (e.g., a cell's predicted arrival time). The conformance stage calculates whether the cell under evaluation is conformant to the algorithm. In other words, the cell's actual arrival time is later than the predicted arrival time, or stated differently the cell did not arrive earlier than the predicted arrival time. The policing device also has an enabling circuit 14 which activates one or both of the processors for each received cell of an ATM input stream and the processors then generate conformance signals. From the conformance signals, an arbitration module 16 generates a discard signal 18 and feedback signals 20, 22, the discard signal indicating whether or not such a cell may be inserted into an ATM output stream by a discard circuit and the feedback signals indicating to a corresponding processor whether or not to carry out an already prepared update of a predicted arrival time used in the above mentioned algorithm. By employing the arbitration module and the enabling circuit, the architecture allows implementation of many policing methods.

The above patent describes the MVSA as comprising the following code:

```
IF (PAT<TIME)
    THEN
        TEMP_PAT:=TIME+NIAT
        CS:=1
    ELSE
        IF (PAT>TIME+γ)
            THEN
                TEMP_PAT:=PAT+NIAT
                CS:=0
            ELSE
                TEMP_PAT:=PAT+NIAT
                CS:=1
```

Wherein,
PAT is a predicted arrival time;
TIME is an arrival time of the handled cell;
TEMP_PAT is a prepared updated value of PAT;
γ is a so-called Cell Delay Variation tolerance;
NIAT is a negotiated cell inter-arrival time;
CS is a conformance value indicating whether or not the handled cell is conforming according to the applied instance of the MVSA. CS=1 is conformant and CS=0 is non-conformant.

The above MVSA is similar to the virtual scheduling algorithm mentioned earlier, except for some modifications. One of the modifications is that the predicted arrival time is not updated directly but that only an update is prepared for it in an intermediate variable TEMP_PAT. Whether or not this update is effectively applied then depends upon a feedback value, FS, in the following way:

```
IF (FS=1) THEN       PAT:=TEMP_PAT
    ELSE             PAT:=PAT
```

Another modification consists in the introduction of a new line allowing for the preparation of an update value even when an instance of the MVSA finds the handled cell to be unsatisfactory. This modification is only needed in applying specific policing methods but is introduced in all cases in order to keep the policing device PD generic, i.e. to allow each and any policing method to be applied by it. It is also implemented by each of the police processors in order to be able to use identical police processors in the policing device.

The above MVSA is split up in a conformance check part, deriving the conformance signal and an update part, preparing an updated value TEMP_PAT and performing the update when instructed by feedback signals. Therefore, in carrying out an instance of the MVSA, the processors prepare the updated value TEMP_PAT and generate the resulting conformance values as the conformance signals. The arbitration module, on the other hand, generates feedback values which the processors use as feedback signals in carrying out the above instance of MVSA.

By defining the operation of the enabling circuit EC and the arbitration module AM, a number of distinct policing methods can be realized. For example, by designing the enabling circuit EC to activate both processors PP1 and PP2 for the high priority first cells and the second processor PP2 only for low priority second cells, the policing method satisfying the ITU-TS recommendation I.371 can be realized. As mentioned earlier, the recommendation states that the ATM stream (aggregate substream) including both high and low priority cells should be policed as a whole while the substream formed by the high priority cells should also be policed separately.

The patent describes a several other policing methods that can be realized by the architecture described therein. Instead of using the cell's arrival time, the described policing method can use a leaky bucket and its fill state to calculate if the packet is conformant. Although described as generic in the patent, the architecture cannot be configured to realize algorithms in which the update algorithm of one processor is a function of the update algorithm of the second processor. In the cases described in the above patent, PP1 and PP2 update independently of one another. The patent also describes the architecture in connection with ATM cell stream only. One of such algorithms which cannot be realized is described immediately below. As will be described in detail, that algorithm uses two leaky buckets and their updates are dependent on one another.

IETF RFC2697 describes a single rate, three colour dual leaky-bucket policing algorithm, called a single rate three colour marker. This policing algorithm is intended to condition variable length packet stream such as IP traffic, including MPLS, Frame Relay, voice/video over Internet etc. This algorithm requires two leaky buckets and the credit update algorithms of the two leaky buckets are codependent. RFC2697 states that this marker can be used as component in a differentiated services traffic conditioner. The algorithm meters a traffic stream (e.g., IP packet stream) and marks its packets either green, yellow, or red. Marking is based on three traffic parameters, Committed Information Rate (CIR), and two associated burst sizes, a Committed Burst Size (CBS) and Excess Burst Size (EBS). The CIR is measured in bytes of IP packets per second and includes the IP header, but not link specific headers. The CBS and EBS are measured in bytes. A packet is marked green if it does not exceed the CBS, yellow if it does exceed the CBS, but not the EBS, and red otherwise. This algorithm is useful, for example, for ingress policing of a service, where only the length, not the peak rate, of the burst determines service eligibility. There are two modes of operation, colour-blind and colour-aware modes.

FIG. 2 is a schematic block diagram of the algorithm for the colour blind mode of operation in which all the packets are treated as coloured green. As seen in FIG. 2, selection circuit 40 passes size, flow, time and colour (in colour aware mode) of a received packet to meter 42 which meters each packet and passes metering result to transmitting circuit 44, which performs action of pass (accept)/mark (Green, Yellow, Red)/drop as indicated by the metering result. The meter consists of two leaky buckets C and E, designated 46 and 48 respectively. Both buckets share the CIR. Conformance (metering) results 50 from the leaky buckets determine the colour of the packet. The conformance results and the fill states of the buckets are processed in a determination block 52 to determine which update function 54 or 56 is to be performed.

The algorithm operates as follows:
The maximum size of bucket C is CBS and that of bucket E is EBS. Tc and Te are bucket fill states of buckets C and E. At time 0, the two buckets are full, i.e., Tc(0)=CBS and Te(0)=EBS. After time 0, the fills of the two buckets, Tc and Te, are updated CIR times per second as follows:
if Tc is less than CBS, Tc is incremented by one, else;
if Te is less than EBS, Te is incremented by one, else;
neither Tc nor Te is incremented.
When a packet of size B bytes arrives at time t, the following happens in the color-blind mode operation:
if Tc(t)−B>=0, the packet is green and Tc is decremented by B down to the minimum value of 0, else;
if Te(t)−B>=0, the packets is yellow and Te is decremented by B down to the minimum value of 0, else;
the packet is red and neither Tc nor Te is decremented.
When a packet of size B bytes arrives at time t, the following happens in the color-aware mode operation:
if the packet has been precoloured as green and Tc(t)−B>=0, the packet is green and Tc is decremented by B down to the minimum value of 0, else;
if the packet has been precoloured as green or yellow and if Te(t)−B>=0, the packets is yellow and Te is decremented by B down to the minimum value of 0, else;
the packet is red and neither Tc nor Te is decremented.
As seen above, in this example, each packet stream is controlled by two leaky buckets and their updating (incrementing or decrementing) depends on the state of the two leaky buckets. In particular, whether or not to update bucket E depends on both the states of bucket C and bucket E itself. The generic architecture described in the above mentioned patent cannot be configured to realize this type of algorithms that require multiple policing engines for each packet stream in which the update algorithm of one police engine is a function of the update algorithm of the next police engine and so on.

SUMMARY OF INVENTION

In accordance with an aspect, the invention relates to a policing apparatus for policing a series of telecommunications packets, which consists of at least pair of police engine modules. Each police engine module includes a conformance unit, a credit unit and a debit unit. A combinatorial module decides on an action to be applied to each received packet and on which police engine modules to update its state, based on conformance results, while the update result of one police engine module is dependent upon that of the other police engine module in the pair.

In a further aspect of the invention, the update function of each police engine consists of credit update and debit update. The credit update of one police engine is a function of the credit update of the other police engine in the pair, where that function may be that they are independent. The debit update of each police engine is based on the decision of the combinatorial module.

In accordance with another aspect, the invention is directed to a policing apparatus for policing a telecommunications traffic consisting of a series of packets. The apparatus includes at least a pair of police engine modules for processing the packets, each police engine module including a conformance unit which generates a conformance result of the processed packet, and a credit unit and a debit unit. The apparatus further includes a selection module for sending a received packet to one or both of the police engine modules in a pair for processing in parallel; a combinatorial module for receiving the conformance results of the police engine modules to decide on a category of the received packet and on which police engine module to update the debit unit, and the credit unit of one police engine module for performing credit updating in response to the state of the credit unit of the other police engine module.

In accordance with yet another aspect, the invention is directed to a method of policing a series of telecommunications packets. The method processes a received packet by at least a pair of police engine modules for conformance. The method decides on an action on the received packet based on a combinatorial relationship of the conformance results of modules. The combinatorial relationship decides on which module to update its state. Additionally, updating of one module depends also upon updating of the other module in the pair.

In accordance with a further aspect, the invention relates to a policing method for policing a telecommunications traffic consisting of a series of packets. The method comprises steps of sending a received packet to at least a pair of police engine modules for processing, each of which has a conformance unit, credit unit and debit unit; updating the credit unit of one police engine module, when instructed by the credit unit of the other police engine module in the pair and metering in each police engine module the received packet at the conformance unit to generate a conformance result. The method further includes steps of generating a combinatorial decision based on a combinatorial relationship of the conformance results within the pair of police engine modules, deciding on a category of the received packet based on the combinatorial decision, and updating the debit unit of a police engine module, selected on the combinatorial decision.

DETAILED DESCRIPTION OF PREFERRED EMBODIMENTS OF INVENTION

Figure 1:
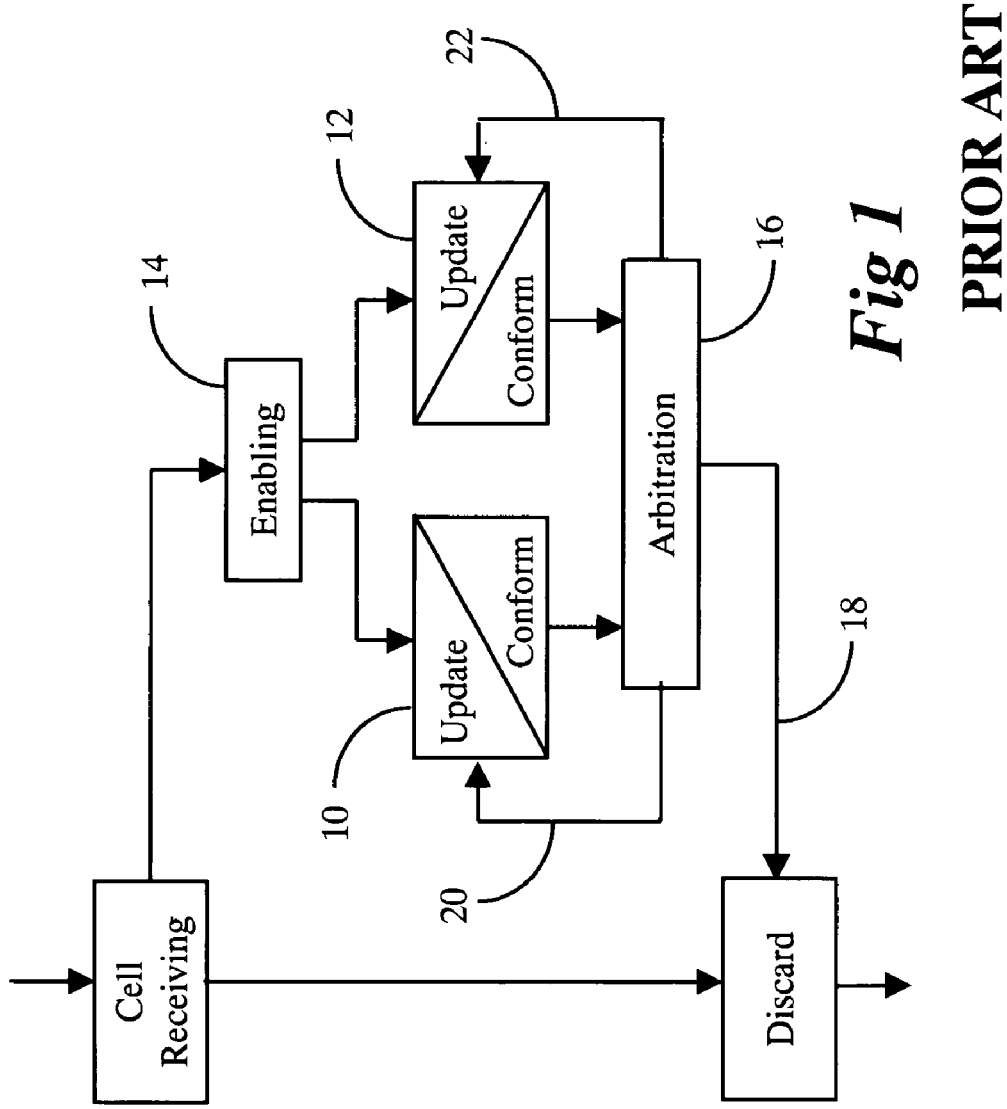
FIG. 1 is a schematic illustration of a policing device described in the earlier U.S. patent.
Figure 2:
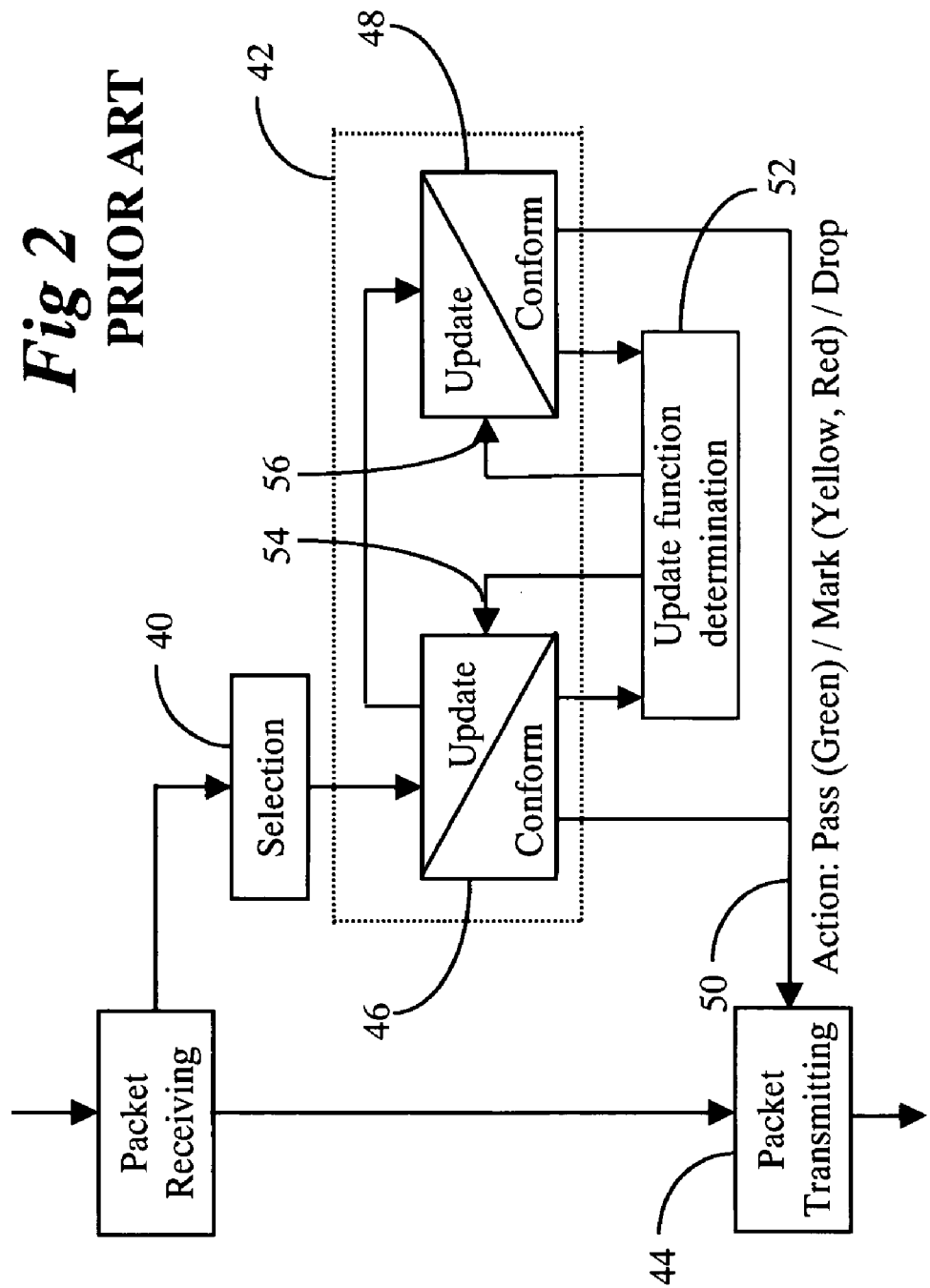
FIG. 2 is a schematic illustration of a policing device according to IETF RFC2697.
Figure 3:
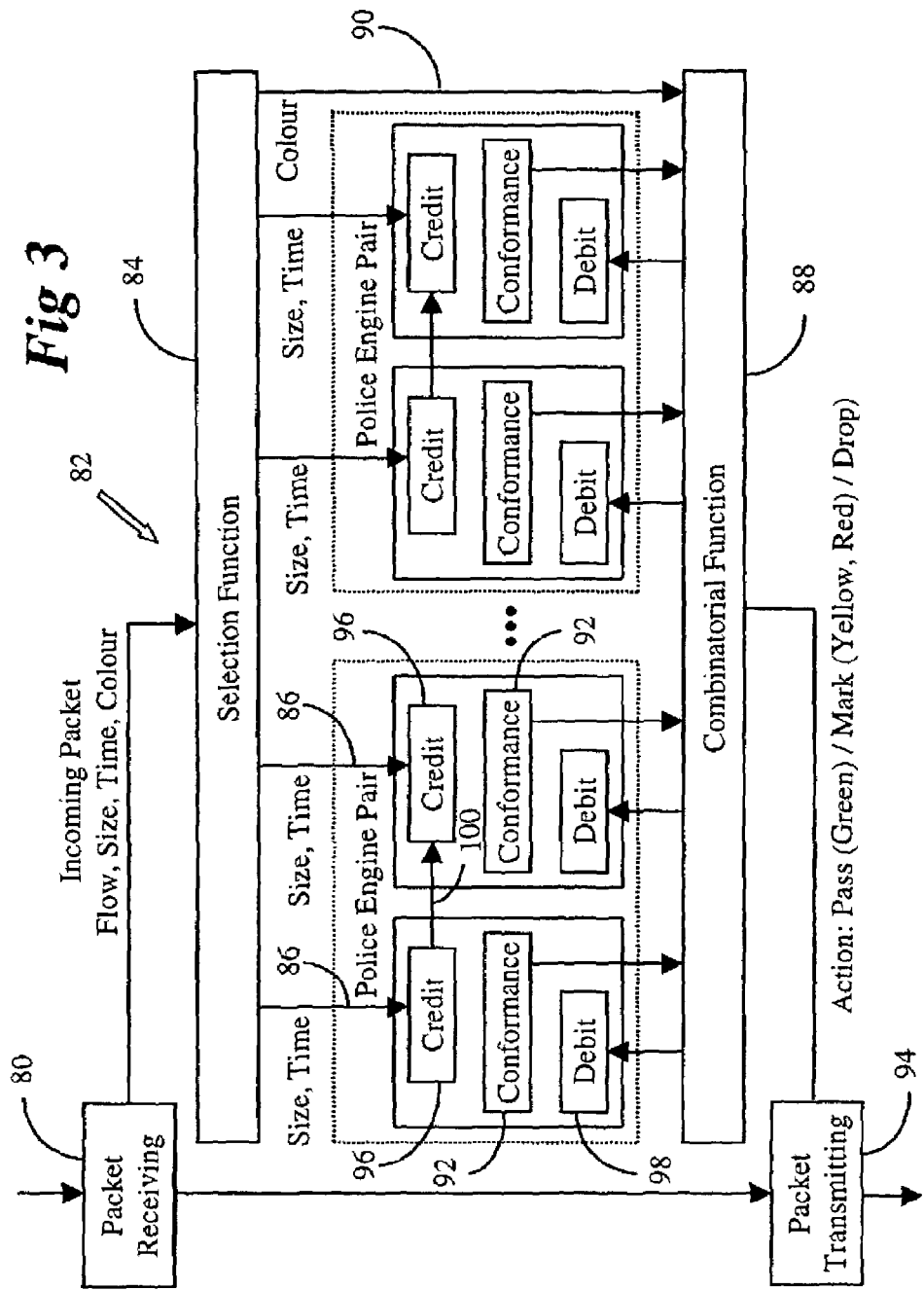
FIG. 3 is a schematic illustration of a policing device according to one embodiment of the invention.

FIG. 3 illustrates, in schematic block diagram, a novel architecture according to one embodiment of the invention. As seen in the Figure, police engines are grouped in pair into a desired number of groups. The number of police engines is determined by the number of rate controls that are required to be applied to a single packet. As stated earlier, a traffic stream may consist of one or two substreams and a packet in the stream may belong to both substreams. Therefore, if each substream requires a rate control, two police engines to police the same packet at different rates are required and they are paired. In this embodiment, each police engine in a pair comprises a police engine algorithm, e.g., the leaky bucket algorithm. The police engine algorithm is separated into 3 units, credit, conformance and debit units, the credit and debit units performing functions of the update stage discussed above in connection with the prior art. A selection function selects one or more desired police engines for a variable length packet of a traffic stream to perform the policing function thereon. A combinatorial function, on the other hand, determines which action to perform and whether or not to perform the update algorithm on any of the police engine algorithms.

Referring to FIG. 3, a packet of variable length arrives at the packet receiving circuit 80 of the policing apparatus 82 and is classified into traffic streams. The flow ID, size, arrival time, and colour (i.e., drop precedence Red, Yellow, or Green) are passed to a select function 84. The memory associated with the traffic streams allows the select function to assign police engines to substreams and the packet is sent to assigned police engines at 86. The packet may be assigned to more than one police engine but substreams of the same traffic stream are assigned to the same police engine pair, because their update is dependent with one another. The select function also outputs the colour directly to the combinatorial function 88 as a function of the packet colour at 90 in the colour awareness configuration of the flow. In the colour blind mode, all the packets are assumed as green and therefore no colour output is needed.

The packet size and arrival time are passed to each selected police engine. Each selected police engine performs the credit update and a debit update. It also performs the conformance check 92 to determine whether or not the packet conforms to the parameters set in the police engine. The conformance check result is calculated for each police engine and is output to combinatorial function 88. The combinatorial function 88 outputs an action to instruct packet transmitting circuit 94, which could be to accept the packet (pass, Green), discard it (drop), or mark it Red or Yellow (mark).

As mentioned above, each police engine performs an update which consists of credit update function 96 and debit update function 98. The credit update algorithms of the two police engines in a pair are codependent as shown by an arrow 100. In other words, the credit update of one engine is a function of the credit update of the other in the pair, where in some cases, that function may be that they are independent from one another. The debit update algorithm of each police engine is the function of the combinatorial function and can be affected by other police engines in the policing apparatus 82 other than the other police engine in the pair. For example, the memory associated with the traffic streams allows the policing apparatus 82 to determine how the conformance results of each police engine influences the debit update of the other police engines in the apparatus. Therefore, in addition to the conformance check result, the combinatorial function outputs an independent signal to each selected police engine which indicates whether the debit update function (algorithm) is performed. Each police engine performs the debit update function if the combinatorial function signal is positive.

According to one embodiment of invention, the architecture described in FIG. 3 is configured to perform the algorithm described in RFC2697 in that instead of periodical updating, the credit updating is performed upon the arrival of a packet and credit updating of one police engine is dependent upon the updating of the other in the pair. The memory associated with a traffic stream allows the police engine pair to determined how the credit update of one police engine in a pair influences the credit update of the other police engine in the pair. Numeral 100 in FIG. 3 shows such a dependency. As described in detail earlier in this specification, the algorithm uses two leaky buckets C and E. When a packet arrives, the fill states, Tc and Te, of buckets C and E are updated in credit as follows:

if Tc is less than CBS, is incremented by one, else;
  if Te is less than EBS, Te is incremented by one, else;
  neither Tc nor Te is incremented.

As seen above, the credit update algorithms for the two leaky buckets are codependent. Although written as periodical in RFC2697, the updating of buckets of this algorithm is, in practice, performed upon arrival of a packet.

Continuing the description of this embodiment, conformance results, Fc and Fe, of respective buckets, C and E, are passed to the combinatorial function. The colour of input packet is also passed to the combinatorial function directly. The combinatorial function maps the conformance results and the colour of the input packet into a decision whether to update each bucket, C and E, and a colour of the output packet, Green, Yellow or Red.

Tables below show decisions and output colours on each possible combination for colour blind and colour awareness configurations. In the tables, 0 is non conformant and 1 indicates conforming. Debit update functions are indicated by Uc and Ue for bucket C and E respectively.

For the colour blind mode of operation, the input packet colour is Green. As there are only 2 binary input variables, there are a total of 4 combinations. Table below shows decision to update bucket C and bucket E.

| Input Colour | Fc | Fe | | Uc | Ue | Output Colour |
|---|---|---|---|---|---|---|
| Green | 0 | 0 | → | 0 | 0 | Red |
| | 0 | 1 | → | 0 | 1 | Yellow |
| | 1 | 0 | → | 1 | 0 | Green |
| | 1 | 1 | → | 1 | 0 | Green |

For the colour aware mode operation, there are 4 combinations for each original colour which are shown below:

| Input Colour | Fc | Fe | | Uc | Ue | Output Colour |
|---|---|---|---|---|---|---|
| Red | 0 | 0 | → | 0 | 0 | Red |
| | 1 | 0 | → | 0 | 0 | |
| | 0 | 1 | → | 0 | 0 | |
| | 1 | 1 | → | 0 | 0 | |
| Yellow | 0 | 0 | → | 0 | 0 | Red |
| | 1 | 0 | → | 0 | 0 | |
| | 0 | 1 | → | 0 | 1 | Yellow |
| | 1 | 1 | → | 0 | 1 | |
| Green | 0 | 0 | → | 0 | 0 | Red |
| | 0 | 1 | → | 0 | 1 | Yellow |
| | 1 | 0 | → | 1 | 0 | Green |
| | 1 | 1 | → | 1 | 0 | Green |

The embodiments described thus far deal with algorithms defined in RFC2697 which uses two leaky buckets because two rate controls are performed. It is also envisioned that there are instances where more than two rate controls are to be performed, in which updating of each control is dependent on any of the other. In such circumstances, more than two police engines are grouped in a group and the combinatorial function can be designed to take into consideration of such relationship.

In further embodiments, there may a plurality of traffic streams and two or more police engine pairs may be needed and within each pair credit updating of one police engine influences the that of the other. It is also possible that a single police engine may service multiple traffic streams by maintaining state for multiple traffic streams. In this case, two or more traffic streams are controlled at the same rate.

In addition to those algorithms described in RFC mentioned above, the present policing architecture can be configured to support other types of police algorithms.

What is claimed as invention is:

1. A policing apparatus for policing a telecommunications traffic consisting of a series of packets, comprising:
    at least a pair of police engine modules for processing the packets, each police engine module including a conformance unit, a credit unit and a debit unit, the conformance unit generating a conformance result of the processed packet,
    a selection module for sending a received packet to one or both of the police engine modules in a pair for processing in parallel;
    a combinatorial module for receiving the conformance results of the police engine modules to decide on a category of the received packet and on which police engine modules to update the debit unit, and
    the credit unit of one police engine module for performing credit updating in response to the state of the credit unit of the other police engine module.

2. The policing apparatus according to claim 1, wherein one police engine module in a pair is set to process the received packet at a different rate than the other police engine module.

3. A policing apparatus for policing a telecommunications traffic consisting of a series of packets, comprising:
    at least a pair of police engine modules for processing the packets, each police engine module including a conformance unit which generates a conformance result of the processed packet based on the state of the police engine module, and a credit unit and a debit unit, the two latter units for adjusting the state of the police engine module as they update;
    a selection module for sending a received packet to one or both of the police engine modules in a pair for processing in parallel; and
    a combinatorial module for receiving the conformance results of the police engine modules to decide on a category of the received packet and on which police engine modules to update the debit unit,
    wherein:
    the conformance unit of each police engine module independently meters the received packet to generate conformance result, based on the state of the police engine module;
    the combinatorial module bases for decision on a preset combinatorial relationship of the conformance results of the police engine modules and instructs the debit unit of the decided police engine module to adjust the state and to classify the received packet, and the credit unit of one police engine module updates in response to the credit unit of another police engine module in the pair.

4. The policing apparatus according to claim 3, wherein one police engine module in a pair is set to process the received packet at a different rate than the other police engine module.

5. The policing apparatus according to claim 4, wherein the telecommunications traffic consists of a plurality of traffic streams and the received packet belongs to more than one traffic stream, the policing apparatus further comprising:
 more than one pair of police engine modules, each pair for policing a traffic stream;
 the selection module for sending a received packet to more than one pair of police engine modules for processing traffic streams; and
 the combinatorial module receiving the conformance results of police engine modules and deciding on categories of the received packet and on which police engine modules to adjust the state, wherein the combinatorial module bases for decision on combinatorial relationships of the conformance results.

6. A policing method for policing a telecommunications traffic consisting of a series of packets, comprising steps of:
 sending a received packet to one or both of at least a pair of police engine modules for processing, each of which has a conformance unit, credit unit and debit unit;
 updating the credit unit of one police engine module, when instructed by the credit unit of the other police engine module in the pair;
 metering in each police engine module the received packet at the conformance unit to generate a conformance result;
 generating a combinatorial decision based on a combinatorial relationship of the conformance results within the pair of police engine modules;
 deciding on a category of the received packet based on the combinatorial decision, and
 updating the debit unit of a police engine module, selected on the combinatorial decision.

7. The policing method according to claim 6, wherein one police engine module in a pair processing the received packet at a different rate than the other police engine module.

8. The policing method according to claim 7, wherein police engine modules in a pair update the respective credit units independently from one another.

9. The policing method according to claim 6, wherein the telecommunications traffic consists of a plurality of traffic streams and the received packet belong to more than one traffic stream, the method further comprising steps of:
 sending a received packet to more than one pair of police engine modules, each pair of police engine modules for policing each traffic stream at different rates.

10. The policing method according to claim 9, further comprising steps of:
 generating a combinatorial decision based on a combinatorial relationship of the conformance results of more than one pair of police engine modules, and
 deciding on a category of the received packet based on the combinatorial decision.

11. The policing method according to claim 10, wherein police engine modules in each pair update the respective credit units independently from one another.

12. The policing method according to claim 9, wherein police engine modules in a pair update the respective credit units independently from one another.

* * * * *